United States Patent
Sawey et al.

(10) Patent No.: US 6,195,330 B1
(45) Date of Patent: Feb. 27, 2001

(54) METHOD AND SYSTEM FOR HIT-LESS SWITCHING

(76) Inventors: David C. Sawey, 3204 Grantham Dr., Richardson, TX (US) 75082; Edmund K. Cher, 2500 Dunwick Dr., Plano, TX (US) 75023

( * ) Notice: Subject to any disclaimer, the term of this patent is extended or adjusted under 35 U.S.C. 154(b) by 0 days.

(21) Appl. No.: 09/186,717

(22) Filed: Nov. 5, 1998

(51) Int. Cl.[7] ....................................... H04J 1/16
(52) U.S. Cl. .................. 370/220; 370/217; 370/228; 370/242; 370/428
(58) Field of Search ................... 370/222, 220, 370/226, 228, 241, 418, 464, 242, 428

(56) References Cited

U.S. PATENT DOCUMENTS

| | | | |
|---|---|---|---|
| 5,051,979 | * 9/1991 | Chaudhuri et al. | 370/506 |
| 5,271,001 | * 12/1993 | Hadano | 370/506 |
| 5,285,441 | * 2/1994 | Bansal et al. | 370/506 |
| 5,315,581 | * 5/1994 | Nakano et al. | 370/506 |
| 5,631,896 | * 5/1997 | Kawase et al. | 370/228 |
| 5,745,476 | * 4/1998 | Chaudhuri | 370/222 |
| 5,987,027 | * 11/1999 | Park et al. | 370/360 |
| 6,023,452 | * 2/2000 | Shiragaki | 370/227 |

* cited by examiner

*Primary Examiner*—Hassan Kizou
*Assistant Examiner*—Mitchell Slavitt
(74) *Attorney, Agent, or Firm*—Gray Cary Ware and Freidenrich LLP

(57) ABSTRACT

A system and method are disclosed for processing digital signals in a telecommunications system that allow hit-less switching between a first digital signal in which a first payload, a first payload indicator marker and a first overhead are transported on a first channel, and a second digital signal in which a second payload identical to the first payload, a second payload indicator marker and a second overhead are transported on a second channel. The present invention includes first and second pointer followers, first and second elastic buffers with control circuits, a monitor circuit, a multiplexer, and a pointer generator. The first and second elastic buffer control circuits each further comprise a write counter, a read counter, a phase detector, and a leak-out mechanism for reinitializing the system after a protection switch. The present invention hit-lessly selects between the first and second digital signals without having to frame align the signals.

33 Claims, 3 Drawing Sheets

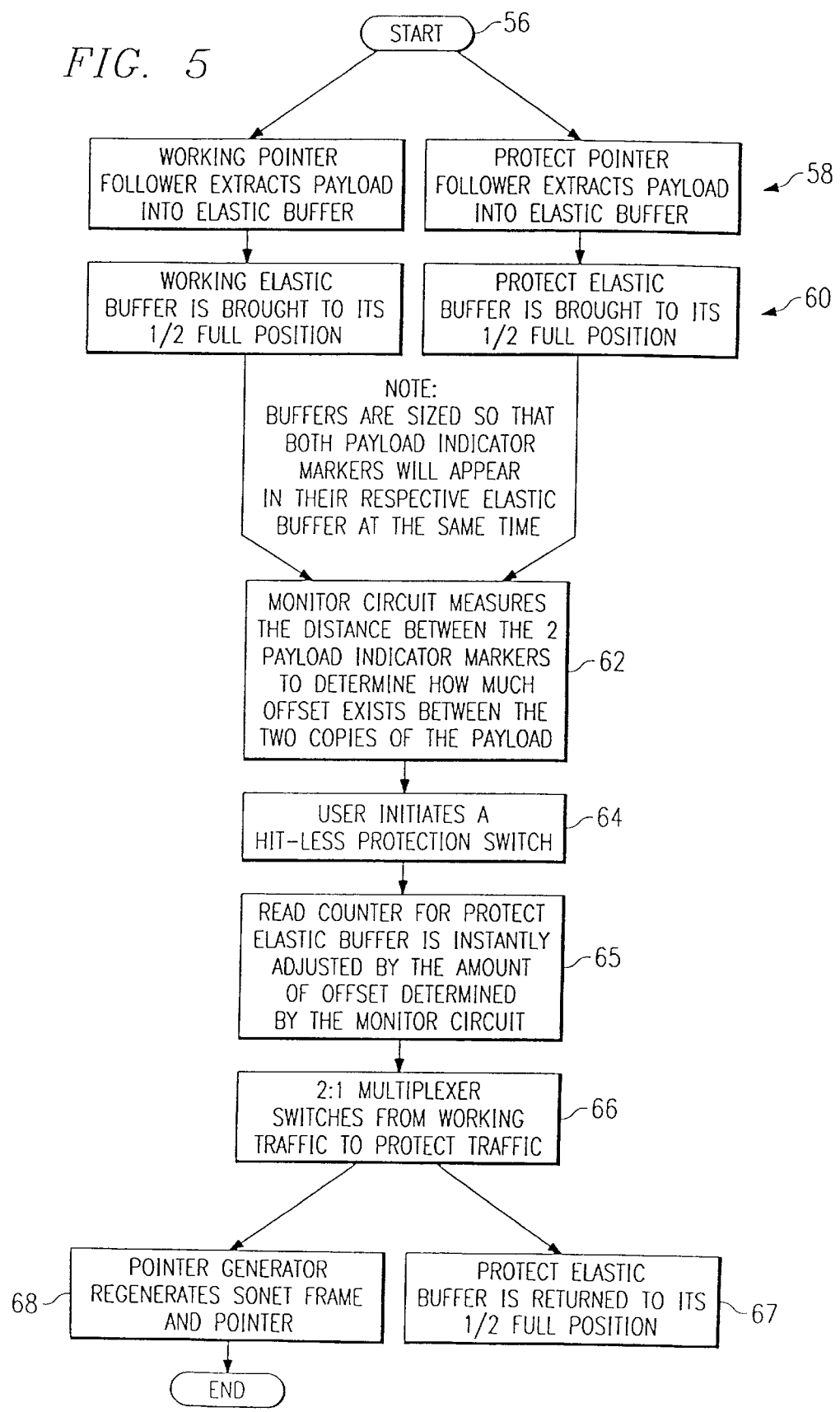

METHOD AND SYSTEM FOR HIT-LESS SWITCHING

TECHNICAL FIELD OF THE INVENTION

The present invention relates generally to switching systems and, more particularly, to an improved system and method for error-less switching from a working channel to an alternate channel carried over a diverse route.

BACKGROUND OF THE INVENTION

Switching of digital signals from a service (working) channel to an alternate (protect) channel, and vice versa, in a communications system can cause a "hit" to the traffic. In other words, the payload can be corrupted during this switch from the working channel to the protect channel. This corruption occurs because the protect channel and the working channel have different signal payload pointer values, and a processor circuit must recognize the different pointer values and align its counter. During this time the traffic can be corrupted.

Hit-less (i.e., error-less) switching systems (for example, for digital radio) are known. In these systems, signals carried on a working channel are switched to a protect channel upon the detection of a predetermined threshold number of errors at the receiver. These prior switching systems accomplish this switching by compensating for the different transmission delays between the working and protect channels by incorporating into each channel a delay build-out equal to the maximum differential delay between the two channels. Furthermore, an additional variable delay can be controllably added to the protect channel. By varying the length of this variable delay, a delay can be added to the protect channel such that the total delay of the protect channel is equal to the total delay of the working channel. The total delay of the working channel is equal to the inherent delay in the working channel plus the delay build-out. Once the delay between the channels has been equalized, the signal can be hit-lessly switched from the working channel to the protect channel.

Such an error-less switching system, however, can only be used when the bit stream transported on the protect channel is identical to the bit stream transported on the working channel. Such a system cannot be used when employing a signal format (for example, the SONET format) in which a payload (i.e., a predetermined unit of data) and a marker indicating the location of the payload can float within each frame and where the bit streams arriving at the receiver from the working and protect channels may not be identical. Furthermore, the overhead bytes of the signal carried on the working channel may be different than the overhead bytes of the signal carried on the protect channel, even if the starting location of the payload and corresponding frames is the same. Signals carried on a SONET network may, for example, need to be re-routed from the working channel to an alternate protect channel which may pass through an intermediate central location. To keep the payload synchronous with the SONET network, the payload may be shifted within the frame. The signals that arrive at the receiving end on the working and protect channels could then possibly be different.

U.S. Pat. No. 5,051,979 claims to teach a method for achieving hit-less switching between SONET signals. In this method, each STS-1 signal is frame-aligned by an individual delay buffer and sent to an individual pointer processor. Inside the pointer processor, each signal's payload data is extracted and inserted into a new frame, along with a new pointer value. At the output of each pointer processor, the new pointer values are sent to a pointer justification and controller circuit. One of the pointer processors is designated the master and the other pointer processor is designated the slave. The pointer justification and controller circuit monitors the pointer value generated by the master pointer processor and, based on the master pointer value, sends justification control information to the slave pointer processor. Thus, at the output of the two pointer processors, the pointer values match. Subsequently, each signal is sent to a 2:1 multiplexer which selects between the two STS-1 channels. Because the signals are both frame- and payload-aligned, a simple 2:1 selection can cause a switch from the working channel to the protect channel and back.

While this method accomplishes hit-less switching in switching systems employing a signal format such as the SONET format, the solution is complex and costly because an initial frame alignment must be performed. Furthermore, this approach requires the generation of two distinct SONET frames before performing the hit-less selection. The circuitry required to implement this solution is complex, requiring a separate pointer processor to regenerate a new SONET frame for each of the two channels before the protection switch can occur.

SUMMARY OF THE INVENTION

Therefore, a need exists for an improved error-less (hit-less) switching technique that provides the capability to perform a hit-less switch between two signals in a communications network without having to first frame align the two signals and which is therefore simpler and less costly than present hit-less switching techniques.

A further need exists for an improved hit-less switching technique that does not require the generation of a distinct SONET frame for each of the two signals prior to the signal selection, but instead allows hit-less switching to occur on the signal payloads prior to regenerating a single SONET frame for the selected signal.

The present invention provides an improved hit-less switching system and method that substantially eliminates or reduces disadvantages and problems associated with previously developed hit-less switching systems and methods used for error-less switching of signals from a working channel to an alternate protect channel.

In particular, the present invention provides a system and method for processing digital signals in a telecommunications system that allows hit-less switching between a first digital signal in which a first payload, a first payload indicator marker, and a first overhead are transported on a first channel, and a second digital signal in which a second payload identical to the first payload, a second payload indicator marker, and a second overhead are transported on a second channel.

The improved hit-less switching system of the present invention includes first and second pointer followers, first and second elastic buffers with control circuits, a monitor circuit, a multiplexer, and a pointer generator. The system selects between working and protect STS-1 (SONET synchronous transport level one) signals without affecting their payload. At the circuit input, each STS-1 signal is processed by one of either the first pointer follower or the second pointer follower, which receives the corresponding signal, removes a corresponding signal overhead and forwards a corresponding signal payload and payload indicator marker into one of either the first elastic buffer with control circuit or the second elastic buffer with control circuit, respectively.

The first and second elastic buffer control circuits each further comprise a write counter in communication with the elastic buffer to write the signal bytes in sequence to the elastic buffer, a read counter in communication with the elastic buffer to read the signal bytes from the elastic buffer, a phase detector to measure the offset between the write counter and the read counter and generate increment/ decrement request signals for the pointer generator, and a leak-out mechanism for reinitializing the system after a protection switch.

Payload indicator markers indicating the start of their corresponding payloads are sent to each elastic buffer every frame. At the elastic buffer outputs, the monitor circuit determines the time difference between the appearance of the two payload indicator markers, which corresponds to the difference in network delay between the two copies of the payload. The read counter for the protect traffic instantaneously adjusts for the amount of delay between the two payload indicator markers. At the pointer generator input, the multiplexer switches from the working channel to the protect channel and forwards the selected payload signal to the pointer generator.

The pointer generator receives the selected payload signal and generates a third overhead and a third payload indicator for the selected payload signal to create a third digital signal with a third payload that is identical to the first and second payloads that originally entered the circuit. The circuit is fully symmetric so that a switch from protect traffic back to working traffic utilizes the same mechanism.

By combining the delay equalization function with the pointer processing function, the present invention implements hit-less switching without the added expense of the two variable delay buffers used in the aforementioned U.S. Pat. No. 5,051,979. Furthermore, the present invention can be incorporated into and further comprise a receiving unit having a receiver to receive each of the STS-1 signals and forward them to their respective pointer followers.

The present invention provides an important technical advantage of an improved hit-less switching technique that provides the capability to perform a hit-less switch between two signals without having to first frame align the two signals and which is therefore simpler and less costly than present hit-less switching techniques.

Another technical advantage of the present invention is that it provides an improved hit-less switching technology that does not require the generation of a distinct SONET frame for each of the two signals prior to the signal selection, but instead allows hit-less switching to occur on the signal payloads prior to regenerating a single SONET frame for the selected signal.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 5 shows a flowchart of one embodiment of the operational steps according to the teaching of the present invention.

DETAILED DESCRIPTION OF THE INVENTION

Preferred embodiments of the present invention are illustrated in the figures, like numerals being used to refer to like and corresponding parts of the various drawings.

The present invention provides the capability for hit-less switching between two digital signals. In a typical application, such as that shown in FIG. 2, a transmitting device 8 and a receiving device 11 can be separated over a long distance. Transmitting device 8 and receiving device 11 can be connected over this long distance by working channel 7 and protect channel 9. The interface between transmitting device 8 and receiving device 11 can be bi-directional and hence can work the same in either direction, but the following description will restrict itself to discussion of only one direction.

Figure 2:
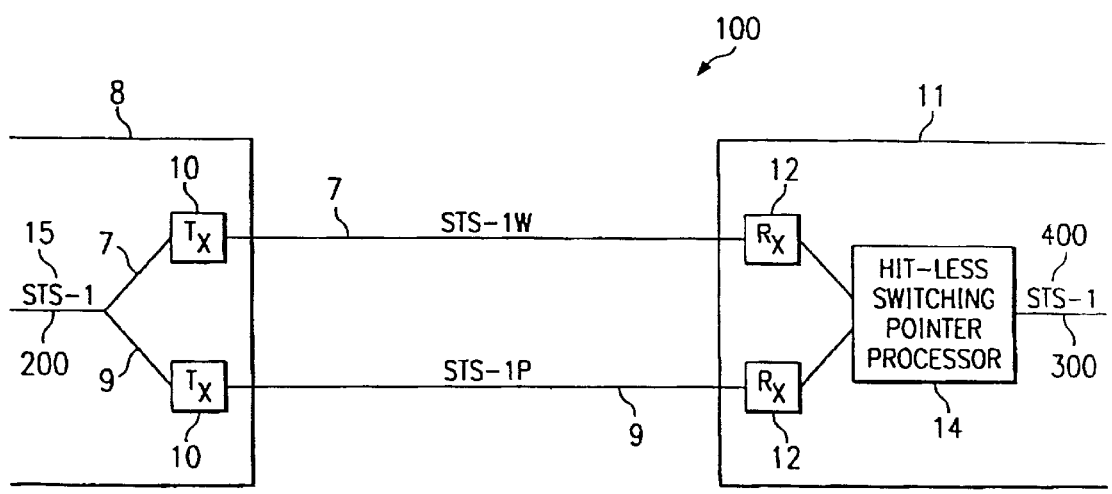
FIG. 2 shows a block diagram representation of an example network incorporating an embodiment of the hit-less switching pointer processor of the present invention.

FIG. 2, shows a block diagram of an embodiment of the hit-less switching pointer processor 14 of the present invention incorporated into a telecommunications system 100. Telecommunications system 100 can be an optical telecommunications system utilizing the SONET signal format. FIG. 2 shows input STS-1 signal 15 originating along input channel 200 in transmitting device 8, where it is split and forwarded to transmitters 10 along working channel 7 and protect channel 9 as working signal STS-1W and protect signal STS-1P, respectively. Transmitters 10, which can be identical transmitters, forward working signal STS-1W and protect signal STS-1P to receivers 12 of receiving device 11 over working channel 7 and protect channel 9, respectively.

Receivers 12 of receiving device 11 receive signals STS-1W and STS-1P. Receivers 12 can be identical receiving units. Receivers 12 forward signals STS-1W and STS-1P to hit-less switching pointer processor 14, which performs the hit-less switching operation on working signal STS-1W and protect signal STS-1P. Hit-less switching pointer processor 14 forwards a reconstituted output STS-1 signal 400, which has an identical payload to input STS-1 signal 15, to the rest of the system along output channel 300.

Working and protect signals STS-1W and STS-1P arrive at hit-less switching pointer processor 14 of FIG. 2 with identical payloads, but with different pointer values. The pointer difference exists because each signal has taken a different path through the network. It is now desirable to select between working signal STS-1W and protect signal STS-1P without affecting their payload. Such a selection between working signal STS-1W and protect signal STS-1P, which does not corrupt their respective payloads, is referred to as a hit-less switch.

In a typical digital signal processing network, the signal carrying the data payload is carried on redundant paths, as described above in connection with FIG. 2, to provide the capability of uninterrupted signal transmission while one of the two channels is down for maintenance. The capability to hit-lessly switch between redundant paths, such as working channel 7 and protect channel 9 above, gives a network user the option to select between channels without loss of data.

Maintenance on one or the other of working channel 7 or protect channel 9 will therefore not affect the user's ability to carry his traffic without interruption. Furthermore, a hit-less switching system such as the present invention can allow for switching between working channel 7 and protect channel 9 in a manner transparent to those receiving the information (payload) being carried on the network.

Figure 3:
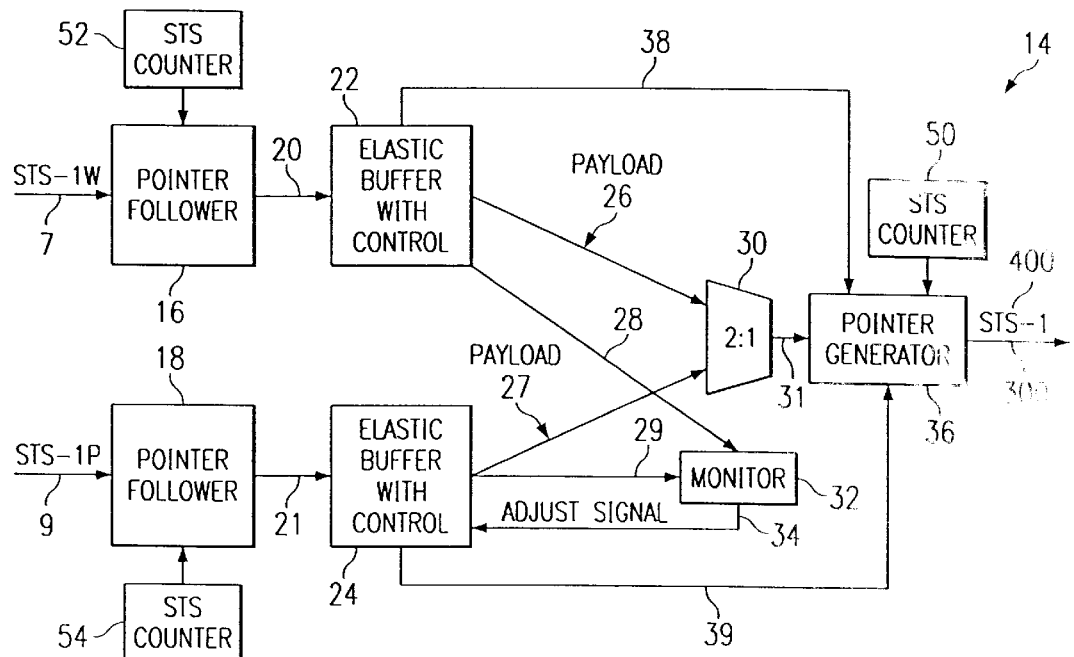
FIG. 3 is a close-up view of a simplified block diagram showing an exemplary implementation of the hit-less switching pointer processor of FIG. 2.

FIG. 3 shows a close-up block diagram of one embodiment of the hit-less switching pointer processor 14 of FIG. 2. At the circuit input, working signal STS-1W is received and processed along working channel 7 by working pointer follower 16. Likewise, protect signal STS-1P is received and processed along protect channel 9 by protect pointer follower 18. Working and protect signals STS-1W and STS-1P are not necessarily frame or pointer aligned when received by pointer followers 16 and 18.

Working pointer follower 16 locates the STS-1 frame in working signal STS-1W and extracts working payload 26 and working payload indicator marker 28. Protect pointer follower 18 locates the STS-1 frame in protect signal STS-1P and extracts protect payload 27 and protect payload indicator marker 29. Working pointer follower 16 and protect pointer follower 18 discard the SONET frame (SONET overhead) after extracting working payload 26 and protect payload 27 from their respective SONET frames. Working payload 26 and protect payload 27 are the actual user traffic.

Working and protect pointer followers 16 and 18 forward working and protect payloads 26 and 27 and working and protect payload indicator markers 28 and 29 to working and protect elastic buffers with control circuit 22 and 24, respectively, as frameless signals 20 and 21. Working pointer follower 16 forwards working frameless signal 20 to working elastic buffer with control circuit 22, and protect pointer follower 18 forwards protect frameless signal 21 to protect elastic buffer with control circuit 24.

Working payload indicator marker 28 and protect payload indicator marker 29 are the two bytes that need to be aligned to ensure that working and protect payloads 26 and 27 are not affected during a protection switch. Working and protect payload indicator markers 28 and 29 pass through working and protect elastic buffers with control circuit 22 and 24 along with working and protect payloads 26 and 27 as an indication (marker) of where the data (payload) is located within working and protect signals STS-1W and STS-1P. Working payload indicator marker 28 and protect payload indicator marker 29 indicate the start of the working and protect payloads 26 and 27 inside their respective SONET frame.

Figure 4:
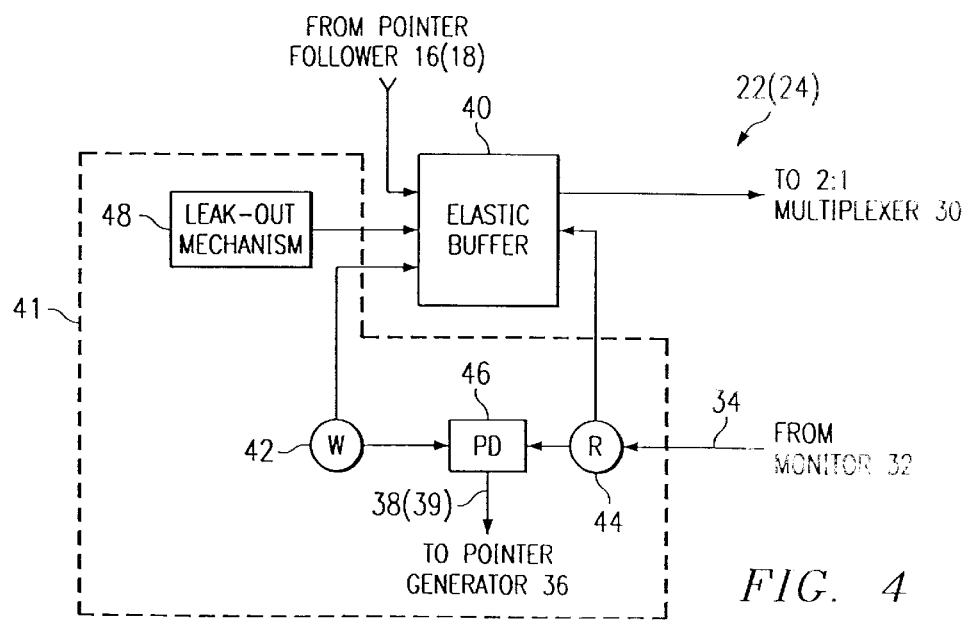
FIG. 4 shows a detailed block diagram view of the elastic buffer with control circuit of FIG. 3.

Working elastic buffer with control circuit 22 receives working frameless signal 20, and protect elastic buffer with control circuit 24 receives protect frameless signal 21. Working elastic buffer with control circuit 22 and protect elastic buffer with control circuit 24 can be two-port ram with independent read and write ports. FIG. 4 shows a representative close-up block diagram detail of either working or protect elastic buffer with control circuit 22 or 24. Working elastic buffer with control circuit 22 and protect elastic buffer with control circuit 24 can be interchangeable and their operation is essentially the same.

On the input side of elastic buffer 40 of FIG. 4, write counter 42 of control circuit 41 (control circuit 41 is shown within the dashed lines) generates write addresses to write either working or protect payload 26 or 27 and working or protect payload indicator marker 28 or 29 into elastic buffer 40. On the output side of elastic buffer 40, read counter 44 generates read addresses for the elastic buffer 40 and reads out either working or protect payload 26 or 27 and working or protect payload indicator marker 28 or 29. Elastic buffer 40 can be a two-port RAM with independent read and write ports (at least one read port and one write port) controlled by read counter 42 and write counter 44.

Phase detector 46 is communicatively connected to write counter 42 and read counter 44, taking inputs from both. Phase detector 46 measures the offset between read counter 44 and write counter 42 and ensures that elastic buffer 40 does not spill (i.e., that it does not run out of data or does not overflow with too much data). Phase detector 46 prevents elastic buffer 40 from spilling by using the measured offset between read counter 44 and write counter 42 to generate increment/decrement request signal 38 (or 39). Phase detector 46 forwards increment/decrement request signal 38 (or 39) to pointer generator 36. Leak-out mechanism 48 returns elastic buffer 40 to its nominal position (i.e., its pre-hit-less switching position). The operation of leak-out mechanism 48 and phase detector 46 is further described below as part of the description of re-initializing hit-less switching pointer processor 14 after a switch from working channel 7 to protect channel 9 has occurred, or vice versa.

In FIG. 4, adjust signal 34 coming from monitor 32 of FIG. 3 adjusts one of either working elastic buffer with control circuit 22's or protect elastic buffer with control circuit 24's corresponding read counter 44. Read counter 44 receives adjust signal 34 and uses it to align working payload indicator marker 28 with protect payload indicator marker 29 prior to, and in order to, perform a hit-less switch from working channel 7 to protect channel 9, or vice versa.

As shown in FIG. 3, working elastic buffer with control circuit 22 forwards payload 26 to 2:1 multiplexer 30 and forwards working payload indicator marker 28 to monitor 32. Protect elastic buffer with control circuit 24 forwards payload 27 (which is identical to payload 26) to 2:1 multiplexer 30 and forwards protect payload indicator marker 29 to monitor 32. Monitor 32 receives working payload indicator marker 28 and protect payload indicator marker 29 and measures the time delay between them. Monitor 32 generates adjust signal 34, which it forwards to control circuit 41 of protect elastic buffer with control circuit 24. Alternatively, monitor 32 can forward adjust signal 34 to control circuit 41 of working elastic buffer with control circuit 22. The system is such that either working or protect elastic buffer with control circuit 22 or 24 can be adjusted to match the other.

The time delay between working and protect payload indicator markers 28 and 29 determines the amount working payload 26 is either delayed or advanced with respect to protect payload 27, or vice versa. Adjust signal 34 adjusts payload indicator marker 28 or 29 by the measured time delay to align working payload 26 and protect payload 27. Once working payload 26 and protect payload 27 are aligned, the switch from working channel 7 to protect channel 9 will be hit-less. Adjusting for the delay differential between working and protect payload indicator markers 28 and 29 is key to making the channel selection hit-less.

During normal operation when, for example, working channel 7 is selected, read counter 44 associated with control circuit 41 of working elastic buffer with control circuit 22 is reading from the associated elastic buffer 40 payload byte sequence. At the same time, read counter 44 associated with control circuit 41 of protect elastic buffer with control circuit 24 is reading out from elastic buffer 40 associated with the protect channel. To make a hit-less switch, hit-less switching pointer processor 14 instantaneously adds or subtracts the adjustment value (the time delay) from protect read counter 44 (or, alternatively, from working read counter 44) to ensure that each byte coming out of working elastic buffer with control circuit 22's elastic buffer 40 is the same as the corresponding byte coming out of protect elastic buffer with control circuit 24's elastic buffer 40.

2:1 multiplexer 30 of FIG. 3 performs the selection (switching) between working payload 26 and protect payload 27. 2:1 multiplexer 30 receives working payload 26 from working elastic buffer with control circuit 22 along working channel 7 and receives protect payload 27 from protect elastic buffer with control circuit 24 along protect channel 9. Once a protection switch is initiated, 2:1 multiplexer 30 switches from the channel on which it was previously receiving payload data (either working channel 7 or protect channel 9) to the other previously non-selected channel. 2:1 multiplexer 30 forwards selected payload 31 to pointer generator 36.

Pointer generator 36 receives selected payload 31 and generates a third SONET overhead and a third payload indicator marker and combines them with selected payload 31 to create a third digital signal, output STS-1 signal 400, with a payload identical to input STS-1 signal 15 shown in transmission device 8 of FIG. 2. Pointer generator 36 regenerates a SONET frame such that the SONET overhead is placed around selected payload 31, and also generates a new pointer value within the SONET overhead to point to the payload in output STS-1 signal 400. By generating only a single SONET overhead at the end of the process, once the selection between working payload 26 and protect payload 27 has been completed, circuit complexity is reduced and the necessity for frame alignment no longer exists.

Unlike the prior art, the present invention regenerates only a single SONET frame using a single pointer generator 36. For example, the prior art hit-less switching system 600 shown in FIG. 1 includes working and protect signals STS-1W and STS-1P transmitted along working and protect channels 7 and 9, respectively. Working and protect signals STS-1W and STS-1P are received by delay buffers 2, which are communicatively connected to corresponding pointer processors 4. Delay buffers 2 are used to frame-align working and protect signals STS-1W and STS-1P. Pointer processors 4 are themselves communicatively connected to one another. Pointer processors 4 payload-align working and protect signals STS-1W and STS-1P and regenerate a separate SONET frame for each of their payloads. The improved hit-less switching system of the present invention eliminates the need for regenerating a second SONET frame.

Figure 1:
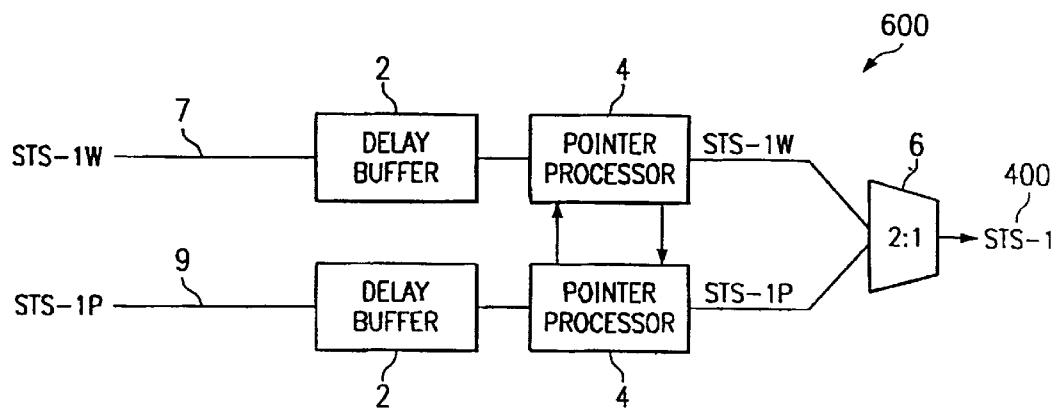
FIG. 1 shows a prior art hit-less switching system.

Furthermore, since only a single SONET frame will be regenerated at the end of the selection process, frame alignment is not required in the present invention. In the present invention, unlike in the prior art of FIG. 1, the position of the frame within working and protect signals STS-1W and STS-1P is not a factor that needs to be taken into account. Therefore, delay buffers 2 of prior art FIG. 1 are not necessary since working and protect signals STS-1W and STS-1P do not need to be frame-aligned.

The operation of pointer generator 36 of FIG. 3 is based on selected payload 31 position: when mapping selected payload 31 position into a new SONET frame, pointer generator 36 produces a pointer value that points to the correct location (i.e., identifies the location) of selected payload 31 within the new SONET frame. STS counter 50 of FIG. 3, communicatively connected to pointer generator 36, determines the STS frame for output STS-1 signal 400. Working pointer follower 16 and protect pointer follower 18 can have corresponding STS counters 52 and 54, which count off (determine) the locations of the STS frames in working and protect signals STS-1W and STS-1P, respectively. STS counters 50, 52 and 54 can be related to each other in whatever relationship is necessary by the particular network. The present invention can work with any arrangement of STS counters 50, 52 and 54.

Together, STS counters 50, 52 and 54 determine the STS frame location within working and protect signals STS-1W and STS-1P and within output STS-1 signal 400. The SONET frame can be anywhere in input STS-1 signal 15 with relation to the output STS-1 signal 400; there need not be any frame alignment performed on working and protect signals STS-1W and STS-1P prior to channel selection.

Frame location within the signal, however, is limited by elastic buffer 40 depth (i.e., how much offset is built into elastic buffer 40 of FIG. 4). By adjusting elastic buffer 40 depth, the amount of frame offset between working and protect channels 7 and 9 can be correspondingly adjusted. If the degree of offset in frame location between working and protect signals STS-1W and STS-1P is not within elastic buffer 40 depth, spilling of elastic buffer 40 can result. A deep elastic buffer 40 can buffer many frames, but if elastic buffer 40 is only one frame deep, then working and protect signals STS-1W and STS-1P can only be offset by about one frame. Elastic buffers 40 can be of whatever size necessary; for example, 16 bytes deep.

The size of elastic buffer 40 determines how much variation can be absorbed between working and protect payload indicator markers 28 and 29. The total range of difference between working and protect payload indicator markers 28 and 29 in turn depends on the difference in delay between working and protect channels 7 and 9. If, for example, the difference in length between working channel 7 and protect channel 9 is one kilometer, a calculation using the speed of light must be performed to determine the delay between working and protect payloads 26 and 27 based on that length difference. Elastic buffers 40 should be sized accordingly to ensure that, based on the path length difference, working and protect payload indicator markers 28 and 29 are in their respective elastic buffers 40 at the same instant (i.e., within one elastic buffer 40 depth of each other).

Another important aspect of working elastic buffer with control circuit 22 and protect elastic buffer with control circuit 24 (or, more particularly, elastic buffers 40 of FIG. 4, which are part of working and protect elastic buffers with control circuit 22 and 24 of FIG. 3) is the fill level of elastic buffer 40 (how to manage the amount of data in the buffer). In other words, after a hit-less switch from either working channel 7 to protect channel 9, or vice versa, elastic buffers 40 may need to be leaked back to a nominal position in order to absorb a subsequent protection switching event.

Any number of elastic buffer 40 leaking solutions can be used in conjunction with the present invention. Two of these solutions are described herein. In the first, each elastic buffer 40 operates in a region near its half-full position. When a protection switch is performed, protect elastic buffer 40 instantly changes its fill percentage to compensate for the time delay between working and protect payloads 26 and 27. Protect elastic buffer 40 may have to leak out its contents in order to return to a nominal position (i.e., its one-half full position) after a protection switch occurs. For this solution to work, each elastic buffer 40 should be sized at least two times the amount of time delay that must be compensated for between working and protect payloads 26 and 27. This is because read counter 44 can only be adjusted by, at most, one-half of the size of elastic buffer 40 to prevent a spill. Leak-out mechanism 48 of FIG. 4 works in conjunction with elastic buffer 40 to leak out the contents of elastic buffer 40 and return it to its nominal position after a switch event.

In an alternative solution, a decision is made by examining working signal STS-1W and protect signal STS-1P to determine which signal is ahead and which is behind. The elastic buffer 40 for the ahead signal would operate near its full position and the elastic buffer 40 for the behind signal would operate near its empty point. Using this approach, the maximum amount of time delay between working and protect payloads 26 and 27 can be compensated for a given elastic buffer 40 size. The ahead signal's elastic buffer 40 would have room to shrink to its near empty position during a protection switch. Similarly, the behind signal's elastic buffer 40 would have room to grow to its near-full position during a protection switch. In this scenario, neither elastic buffer 40 would have to be leaked out after a protection switch. However, if it were determined by the circuit that the initially behind signal had turned into the ahead signal due to changes in the network, then a leak-out would have to be performed to re-orient the two elastic buffers 40. Leak-out mechanism 48 of FIG. 4 could then still be necessary.

As part of sizing elastic buffers 40 for a particular application, it should be taken into account that working and protect payload indicator markers 28 and 29 should be present inside their respective elastic buffers 40 at the same time. A corollary of this is that the system should be able to handle a situation where working and protect payload indicator markers 28 and 29 are within corresponding elastic buffers 40, but are in non-corresponding frames. This situation could be accounted for by specifying ahead of time the amount of time delay between working and protect payloads 26 and 27 that can be compensated for within hit-less switching pointer processor 14 by sizing elastic buffers 40 appropriately. The minimum elastic buffer 40 size should be approximately equal to the amount of delay to be compensated, plus some fixed overhead for frequency justification, overhead gaps in the payload, and a guard band.

In the improved hit-less switching system of the present invention, the amount of time delay compensation performed by hit-less switching pointer processor 14 is preferably less than one-half of a SONET frame, or 62.5 milliseconds. Therefore, locating the matching working or protect payload indicator marker 28 or 29 can be done by simply selecting the closest working or protect payload indicator marker 28 or 29. However, even in applications where there is some question as to which working or protect payload indicator marker 28 or 29 belongs to the same frame, there is a solution utilizing the SONET overhead. In a particular path overhead, a B3 byte contains a BIP-8 calculation performed over the entire signal. Since the working and protect SONET frames carry the same working and protect payloads 26 and 27, the B3 bytes in matching frames should match. Thus, by comparing the B3 bytes in working and protect payloads 26 and 27, the circuit can determine which working or protect payload indicator markers 28 or 29 belong to the same frame.

FIG. 5 is a flowchart diagramming the overall operation of the present invention. Step 56 corresponds to input STS-1 signal 15 that has already been split into working and protect signals STS-1W and STS-1P along working channel 7 and protect channel 9, respectively. At step 58, working and protect pointer followers 16 and 18 receive working and protect signals STS-1W and STS-1P. Working and protect pointer followers 16 and 18 extract working and protect payloads 26 and 27 and working and protect payload indicator markers 28 and 29 from working and protect signals STS-1W and STS-1P, respectively, and forward them to working and protect elastic buffers with control circuit 22 and 24. Step 60 shows the first of the two leaking solutions described for dealing with re-initializing elastic buffers 40 after a switching event. At step 60, working and protect elastic buffers 40 are brought to their one-half full positions. Both elastic buffers 40 should be sized so that working and protect payload indicator markers 28 and 29 appear in their respective elastic buffer 40 at the same time. Step 60 alternatively could correspond to the second leaking solution described above in which one elastic buffer 40 operates near its full point and the other near its empty point.

At step 62 of FIG. 5, monitor 32 of FIG. 3, independently of the fill position, measures the distance (difference) between working and protect payload indicator markers 28 and 29. Monitor 32 thus determines the degree of offset between working and protect payloads 26 and 27, and hence how much of an adjustment must be made to working and protect payload indicator marker 28 or 29 to make the protection switch hit-less. At step 64, it is safe for the user to initiate a protection switch and the hit-less switch is initiated. Steps 58 through 62 correspond to an initialization stage used to indicate when it is safe to perform a hit-less switch from working channel 7 to protect channel 9, or vice versa. Step 64 corresponds to the actual switch from working channel 7 to protect channel 9, or vice versa.

Simultaneously with initiating a switch from working channel 7 to protect channel 9, or vice versa, in step 65 read counter 44 for protect elastic buffer 40 (or read counter 44 for the currently non-selected channel) is adjusted by the amount of offset between working payload indicator marker 28 and protect payload indicator marker 29 as determined by monitor 32. This ensures that the same bytes that would have been read from working elastic buffer 40 (or the currently selected channel elastic buffer 40) are being read from protect elastic buffer 40 (or from the currently non-selected elastic buffer 40). Monitor 32 performs this operation by generating adjust signal 34 and forwarding it to read counter 44 of the elastic buffer 40 that is being adjusted. Read counter 44 either adds or subtracts the difference between working and protect payload indicator markers 28 and 29.

In step 66 of FIG. 5, simultaneously with step 65, 2:1 multiplexer 30 of FIG. 3 switches from working channel 7 to protect channel 9 (or vice versa). From this point forward the system uses selected payload 31, which corresponds to protect payload 27 from protect elastic buffer 40 (or to the payload corresponding to the previously non-selected elastic buffer 40). Selected payload 31 is forwarded to pointer generator 36 by 2:1 multiplexer 30.

Following step 66, FIG. 5 branches into simultaneous steps 67 and 68. At step 67, protect elastic buffer 40 is returned to its one-half full position, if necessary, through leak-out mechanism 48 of FIG. 4. Leak-out mechanism 48 re-initializes the circuit to allow a switch back to the originally selected channel when necessary.

In step 68, selected payload 31 is received by pointer generator 36. Pointer generator 36 creates output STS-1 signal 400 by regenerating a new SONET frame around selected payload 31 and generating a new payload indicator marker to indicate the position of selected payload 31 within the new SONET frame. Pointer generator 36 forwards output STS-1 signal 400 to the rest of the system.

After a switching event takes place from working channel 7 to protect channel 9, or vice versa, leak-out mechanism 48 may be required to realign the system. If the system is not first realigned, a subsequent switching event may not be hit-less and data could possibly be corrupted. During the time delay while elastic buffers 40, corresponding to working elastic buffer with control circuit 22 and protect elastic buffer with control circuit 24, are being leaked by their corresponding leak-out mechanisms 48 (if necessary), another hit-less switch cannot be performed. This time delay places a restriction on consecutive switches between working and protect channels 7 and 9 if such a leak-out is required.

As shown in FIG. 4, leak-out mechanism 48 works in conjunction with phase detector 46 to initiate a leak-out and realign the system. Phase detector 46 measures the offset between read counter 44 and write counter 42. That offset determines elastic buffer 40 fill level (i.e., how full/empty the corresponding elastic buffer 40 is). Phase detector 46 generates increment/decrement request signal 38 (or 39) and forwards it to pointer generator 36 as shown in FIG. 3. Pointer generator 36 receives increment/decrement request signals 38 and 39 and generates pointer movements based on them. These pointer movements are used to adjust elastic buffers' 40 fill levels.

For example, in the first solution described for re-initializing hit-less switching pointer processor 14 (in which each elastic buffer 40 operates in a region near its half-full position), during the initialization phase each elastic buffer 40 is brought to its one-half full position by increment/decrement request signal 38 or 39. After a switch from working channel 7 to protect channel 9 occurs, protect elastic buffer 40 is no longer at its one-half full position. At that point, phase detector 36 associated with protect channel 9 should generate the appropriate increment/decrement request signal 39 to bring protect elastic buffer 40 back to its one-half full position. Phase detector 36 measures elastic buffer 40 level by comparing read counter 44 and write counter 42. Phase detector 36 generates increment/decrement request signal 39, which is used by pointer generator 36 to move its pointer. This pointer movement controls the level in the elastic buffer 40. This feedback mechanism occurs at step 67 of FIG. 5.

While the present invention has been described from the point of view of a working channel and a protect channel, it is understood that the channels are interchangeable. Similarly, working and protect signals STS-1W and STS-1P have been described in terms of a single frame which is operated on by hit-less switching pointer processor 14; however, each can be comprised of a series of frames and corresponding series of payloads and payload indicators transported on a given channel. Likewise, the frames (overheads) of a given signal can have starting locations on the working channel different from those on the protect channel for a given payload. The present invention has been described in terms of the SONET signal format, but the present invention is also applicable to other signal formats having similar characteristics in telecommunications systems requiring hit-less switching between alternate channels.

In summary, the present invention provides an improved hit-less switching system and method that allows hit-less switching between a first digital signal in which a first payload, a first payload indicator, and a first overhead are transported on a first channel, and a second digital signal in which a second payload identical to the first payload, a second payload indicator, and a second overhead are transported on a second channel.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A system for processing digital signals in a telecommunications system that allows hit-less switching between a first digital signal, in which a first payload, a first payload indicator marker and a first overhead are transported on a first channel, and a second digital signal, in which a second payload identical to the first payload, a second payload indicator marker and a second overhead are transported on a second channel, comprising:

a first pointer follower to receive the first signal, remove the first overhead, and forward the first payload and the first payload indicator marker;

a second pointer follower to receive the second signal, remove the second overhead, and forward the second payload and the second payload indicator marker;

a first elastic buffer with control circuit to receive the first payload and the first payload indicator marker, to forward the first payload indicator marker, and to forward the first payload;

a second elastic buffer with control circuit to receive the second payload and the second payload indicator marker, to forward the second payload indicator marker, and to forward the second payload;

a monitor circuit to measure a time delay between the first payload indicator marker and the second payload indicator marker and to adjust one of the first or second elastic buffer control circuits by the measured time delay to align the first payload indicator marker and the second payload indicator marker with each other;

a multiplexer to receive the first payload and the second payload, to select between the first payload and the second payload, and to forward a selected payload; and a pointer generator to receive the selected payload, to generate a third overhead and a third payload indicator, and to include the third overhead and third payload indicator with the selected payload to create a third digital signal with a third payload identical to the first and second payloads.

2. The system of claim 1, wherein the first digital signal and the second digital signal have a format in which a signal payload and a payload indicator marker can float within a signal frame.

3. The system of claim 1, wherein the first digital signal and the second digital signal have a SONET signal format.

4. The system of claim 1, wherein the monitor circuit adjusts the first elastic buffer control circuit by the measured time delay to align the first payload indicator marker with the second payload indicator marker.

5. The system of claim 1, wherein the monitor circuit adjusts the second elastic buffer control circuit by the measured time delay to align the second payload indicator marker with the first payload indicator marker.

6. The system of claim 1, wherein the first elastic buffer control circuit further comprises:

a first write counter in communication with the first elastic buffer to write the first signal bytes in sequence to the first elastic buffer;

a first read counter in communication with the first elastic buffer to read the first signal bytes in sequence from the first elastic counter; and a first phase detector to measure the offset between the first write counter and the first read counter and generate a first increment/decrement request signal for the pointer generator; and wherein the second elastic buffer control circuit further comprises:

a second write counter in communication with the second elastic buffer to write the second signal bytes in sequence to the second elastic buffer;

a second read counter in communication with the second elastic buffer to read the second signal bytes in sequence from the second elastic counter; and a second phase detector to measure the offset between the second write counter and the second read counter and generate a second increment/decrement request signal for the pointer generator.

7. The system of claim 6, wherein the monitor circuit adjusts the first read counter by the measured time delay to align the first payload indicator marker with the second payload indicator marker.

8. The system of claim 6, wherein the monitor circuit adjusts the second read counter by the measured time delay to align the second payload indicator marker with the first payload indicator marker.

9. The system of claim 6, wherein the first elastic buffer control circuit further comprises a first leaking mechanism to reinitialize the first elastic buffer, and wherein the second elastic buffer control circuit further comprises a second leaking mechanism to reinitialize the second elastic buffer, following a hit-less switch from the first digital signal to the second digital signal, or vice-versa.

10. The system of claim 9, wherein the first and second elastic buffers operate near their half-full position and wherein the first and second elastic buffers are sized to compensate for at least two times the time delay between the first payload and the second payload during a switch from the first digital signal to the second digital signal, or vice versa.

11. The system of claim 9, wherein the first elastic buffer operates near its full position and the second elastic buffer operates near its empty position, or vice versa, to be able to compensate for the time delay between the first payload and the second payload during a switch from the first digital signal to the second digital signal, or vice versa.

12. The system of claim 1, further comprising a receiving unit having a first receiver to receive the first signal and forward it to the first pointer follower and a second receiver to receive the second signal and forward it to the second pointer follower.

13. The system of claim 1, further comprising:

a first STS counter communicatively connected to the first pointer follower to track the first overhead frame structure;

a second STS counter communicatively connected to the second pointer follower to track the second overhead frame structure; and a third STS counter communicatively connected to the pointer generator to track the third overhead frame structure.

14. The system of claim 1, wherein the first signal is further comprised of a first series of overheads in which a first series of payloads and a first series of payload indicator markers are being transported on a first channel, and wherein the second signal is further comprised of a second series of overheads in which a second series of payloads identical to the first series of payloads and a second series of payload indicator markers are being transported on a second channel.

15. The system of claim 14, wherein the second series of overheads have payload starting locations, for particular ones of the second series of overheads, that can be different from the starting locations of identical particular payloads in the first series of overheads.

16. The system of claim 1, wherein the first channel comprises a working channel and the second channel comprises a protect channel.

17. The system of claim 1, wherein the first and second elastic buffers are sized such that the first payload indicator marker and the second payload indicator marker are located in the first elastic buffer and in the second elastic buffer, respectively, at the same time.

18. The system of claim 1, wherein the first channel is a first fiber-optic line and the second channel is a second fiber-optic line.

19. A method for processing digital signals in a telecommunications system that allows hit-less switching between a first digital signal, in which a first payload, a first payload indicator marker and a first overhead are transported on a first channel, and a second digital signal, in which a second payload identical to the first payload, a second payload indicator marker and a second overhead are transported on a second channel, comprising:

receiving the first signal at a first pointer follower, removing the first overhead, and forwarding the first payload and the first payload indicator marker;

receiving the second signal at a second pointer follower, removing the second overhead, and forwarding the second payload and the second payload indicator marker;

receiving the first payload and the first payload indicator marker at a first elastic buffer with control circuit, forwarding the first payload indicator marker, and forwarding the first payload;

receiving the second payload and the second payload indicator marker at a second elastic buffer with control circuit, forwarding the second payload indicator marker, and forwarding the second payload;

measuring a time delay between the first payload indicator marker and the second payload indicator marker at a monitor circuit and adjusting one of the first or second elastic buffer control circuits by the measured time delay to align the first payload indicator marker and the second payload indicator marker;

receiving the first payload and the second payload at a multiplexer, selecting between the first payload and the second payload, and forwarding a selected payload; and receiving the selected payload at a pointer generator, generating a third overhead and a third payload indicator, and including the third overhead and third payload indicator with the selected payload to create a third digital signal with a third payload identical to the first and second payloads.

20. The method of claim 19, further comprising making the format of the first digital signal and the second digital signal a format in which a signal payload and a payload indicator marker can float within a signal frame.

21. The method of claim 19, further comprising making the format of the first digital signal and the second digital signal a SONET signal format.

22. The method of claim 19, further comprising adjusting the first elastic buffer control circuit by the measured time delay with the monitor circuit to align the first payload indicator marker with the second payload indicator marker.

23. The method of claim 19, further comprising adjusting the second elastic buffer control circuit by the measured time delay with the monitor circuit to align the second payload indicator marker with the first payload indicator marker.

24. The method of claim 19, wherein the first elastic buffer control circuit further comprises:

a first write counter in communication with the first elastic buffer to write the first signal bytes in sequence to the first elastic buffer;

a first read counter in communication with the first elastic buffer to read the first signal bytes in sequence from the first elastic counter; and a first phase detector to measure the offset between the first write counter and the first read counter and generate a first increment/decrement request signal for the pointer generator to prevent the first elastic buffer from spilling; and wherein the second elastic buffer control circuit further comprises:

a second write counter in communication with the second elastic buffer to write the second signal bytes in sequence to the second elastic buffer;

a second read counter in communication with the second elastic buffer to read the second signal bytes in sequence from the second elastic counter; and a second phase detector to measure the offset between the second write counter and the second read counter and generate a second increment/decrement request signal for the pointer generator to prevent the second elastic buffer from spilling.

25. The method of claim 24 further comprising adjusting the first read counter by the measured time delay with the monitor circuit to align the first payload indicator marker with the second payload indicator marker.

26. The method of claim 24 further comprising adjusting the second read counter by the measured time delay with the monitor circuit to align the second payload indicator marker with the first payload indicator marker.

27. The method of claim 19, wherein the first elastic buffer control circuit further comprises a first leaking mechanism to reinitialize the first elastic buffer, and wherein the second elastic buffer control circuit further comprises a second leaking mechanism to reinitialize the second elastic buffer, following a hit-less switch from the first digital signal to the second digital signal, or vice-versa.

28. The method of claim 27, further comprising the steps of:

sizing the first and second elastic buffers to compensate for at least two times the time delay between the first payload and the second payload during a switch from the first digital signal to the second digital signal, or vice versa; and operating the first and second elastic buffers near their half-full position.

29. The method of claim 27, further comprising the steps of operating the first elastic buffer near its full position and operating the second elastic buffer near its empty position, or vice versa, to be able to compensate for the time delay between the first payload and the second payload during a switch from the first digital signal to the second digital signal, or vice versa.

30. The method of claim 19, further comprising:

tracking the first overhead frame structure with a first STS counter communicatively connected to the first pointer follower;

tracking the second overhead frame structure with a second STS counter communicatively connected to the second pointer follower; and tracking the third overhead frame structure with a third STS counter communicatively connected to the pointer generator.

31. The method of claim 19, further comprising using the first channel as a working channel and using the second channel as a protect channel.

32. The method of claim 19, further comprising sizing the first and second elastic buffers such that the first payload indicator marker and the second payload indicator marker are located in the first elastic buffer and in the second elastic buffer, respectively, at the same time.

33. The method of claim 19, further comprising making the first channel a first fiber-optic line and the second channel a second fiber-optic line.

* * * * *